US006553896B1

(12) United States Patent
Heide

(10) Patent No.: US 6,553,896 B1
(45) Date of Patent: Apr. 29, 2003

(54) BEVERAGE CAN COOKING APPARATUS

(76) Inventor: Steven J. Heide, 84961 Old Hwy., No. 8, Islamorada, FL (US) 33036

( * ) Notice: Subject to any disclaimer, the term of this patent is extended or adjusted under 35 U.S.C. 154(b) by 0 days.

(21) Appl. No.: 09/876,371

(22) Filed: Jun. 7, 2001

Related U.S. Application Data

(60) Provisional application No. 60/217,407, filed on Jul. 11, 2000.

(51) Int. Cl.[7] ................................................ A47J 43/18
(52) U.S. Cl. ......................... 99/347; 99/419; 99/421 V; 99/426
(58) Field of Search ........................ 99/426, 346, 345, 99/347, 357, 421 V, 419, 482, 339, 449; 126/25 R, 9 R, 41 R

(56) References Cited

U.S. PATENT DOCUMENTS

| | | | | |
|---|---|---|---|---|
| 979,388 | A | * 12/1910 | Ericson | 99/449 |
| 1,216,525 | A | * 2/1917 | Weaver | 99/449 |
| 4,027,583 | A | 6/1977 | Spanek et al. | 99/421 |
| 4,633,773 | A | * 1/1987 | Jay | 99/426 |
| 4,709,626 | A | 12/1987 | Hamlyn | 99/426 |
| 5,069,117 | A | 12/1991 | Schlessel | 99/419 |
| 5,106,642 | A | 4/1992 | Ciofalo | 426/509 |
| 5,301,602 | A | 4/1994 | Ryczek | 99/345 |
| 5,893,320 | A | 4/1999 | Demaree | 99/419 |
| 6,062,131 | A | 5/2000 | Holland | 99/345 |
| 6,119,585 | A | * 9/2000 | Guidry | 99/345 |
| 6,119,588 | A | * 9/2000 | Tiemann | 99/426 |
| 6,125,739 | A | 10/2000 | Jernigan | 99/345 |
| 6,216,586 | B1 | * 4/2001 | Burgin | 99/345 X |

* cited by examiner

Primary Examiner—Reginald L. Alexander
(74) Attorney, Agent, or Firm—Malin, Haley & DiMaggio, P.A.

(57) ABSTRACT

A collapsible cooking stand or apparatus is disclosed and includes two "U" shaped members pivotally attached to a base member. In use the two members are securely retained in their assembled vertical position. A can holder is movably attached to the second "U" shaped member to support the can and its liquid contents from the bottom. The cooking apparatus can be used with various heating elements. The "U" shaped members form a stand that is inserted into the cavity of the chicken, along with the open portion of the supported beverage can. In this position, moisture from the contents inside the can is release into the cavity to compensate for moisture normally lost from cooking the chicken.

29 Claims, 5 Drawing Sheets

BEVERAGE CAN COOKING APPARATUS

This application claims the benefit of U.S. Provisional Application No. 60/217,407, filed Jul. 11, 2000.

BACKGROUND OF THE INVENTION

1. Field of the Invention

This invention relates to cooking apparatuses, and in particular, to a beverage can cooking apparatus for roasting chickens, turkeys, ducks, birds, etc. (hereinafter for the specification and claims all collectively referred to as "chicken" or "chickens").

2. Description of Related Art

When cooking chickens and the like, it is not uncommon for the chicken to lose its moisture due to the relatively long exposure of the chicken to high temperatures during the cooking process. An internal cavity for the chicken can be created prior to or after the purchase of the chicken by the consumer. Thus, devices have been used in the past to act as a stand for the chicken and also allow for steam to be introduced into the internal cavity during cooking to prevent drying of the chicken. These stands typically include tube or cone like members attached to a base. The tube or cone is inserted within the internal cavity of the chicken. The tube or cone typically consist of a perforated wall member.

Examples of these structures include U.S. Pat. No. 5,106,642 issued to Ciofalo for a Roasting Support for Fowl; U.S. Pat. No. 6,125,739 issued to Jernigan for a Device for Supporting and Steaming Fowl; U.S. Pat. No. 5,301,602 issued to Ryczek for a Fat-Free Roaster for Poultry and Meat; U.S. Pat. No. 6,062,131 issued to Holland for a Roasting Stand Adapted to Deliver Flavored Steam During the Cooking Process; U.S. Pat. No. 5,893,320 issued to Demaree for a Device for Cooking Fowl; and U.S. Pat. No. 4,709,626 issued to Hamlyn for a Foldable Chicken Holder.

To permit steam to be introduced back into the chicken, the prior art has provided relatively complicated structures. One method known for cooking chicken is in conjunction with a beverage can, such as partially filled beer can. None of the prior art devices discussed above provide a structure for properly positioning a beverage can, at least partially within the cavity of the chicken, to allow the moisture from the liquid disposed within the can to be released into the cavity to keep the chicken moist.

It is therefore to the effective resolution of the aforementioned problems and shortcomings that the present invention is directed.

BRIEF SUMMARY OF THE INVENTION

The present invention provided a cooking apparatus, including a can retainer, for cooking chickens. The apparatus includes two preferably "U" shaped members pivotally attached to a base member. Base member is preferably circular in shape, though such is not considered limiting. A first of the two "U" shaped members is slightly longer in length that the second "U" shaped member, such that, when in use, the larger first "U" shaped member rides over the second "U" shaped member. When the "U" shaped members begin to reach their "in use—assembled" position they begin to abut.

A small groove, notch or other indentation is preferably provided at the top or apex of the second "U" shaped member. Thus, when assembling the cooking apparatus for use, the first "U" shaped member rides over the second "U" shaped member until the first member drops into the groove, where it is securely retained to maintain the "U" shaped members in their assembled vertical position during use. The size of the groove is at least large enough to receive enough of a cross-sectional portion of the first "U" shaped member to securely retain the first member during use of the invention.

A can holder is provided and in one embodiment movably attached to the second "U" shaped member and in a second embodiment permanently attached to the second "U" shaped member. In one movable embodiment, can holder can be shaped as an elongated bar having an aperture at each end for receipt therethrough of the second "U" shaped member. Other shapes for the can holder can be provided and are considered within the scope of the invention. In its assembled position, the can holder is preferably located toward the bottom of the cooking apparatus to support the can from the bottom. In a permanent embodiment, the can holder can be a circular bar attached to the second "U" shaped member at two separate points. Other shapes and configurations can also be used for the permanent embodiment and are all considered within the scope of the invention.

Though a can, such as a twelve ounce beer can is preferred, the present invention is not limited to such, and other objects that hold liquid can be used in lieu of a beer can, such as a glass, cup, bottle, etc. The present invention cooking apparatus can be used with various heating elements, such as but not limited to kettle grills, gas grills, ovens, etc.

When not in use the cooking apparatus is collapsed or folded for ease in storage or transit by popping first "U" shaped member out of its resting position within the groove of the second "U" shaped member. Such effort to remove the first member out of the groove of the second member can be provided by a small amount of force from the user.

Accordingly, it is an object of this invention to provide a cooking apparatus that permits moisture to be provided to a chicken during cooking.

It is another object of the invention to provide a cooking apparatus that positions a beverage can within the internal cavity of a chicken while cooking the chicken.

It is still another object of this invention to provide a cooking apparatus that positions a beverage can within the internal cavity of a chicken while also serving as a stand for the chicken.

It is yet another object of this invention to provide a cooking apparatus that positions a beverage can within the internal cavity of a chicken to introduce moisture into the cavity during cooking of the chicken.

It is even still another object of the invention to provide a cooking apparatus that positions a beverage can within the internal cavity of a chicken while cooking the chicken where the apparatus is collapsible or foldable.

In accordance with these and other objects which will become apparent hereinafter, the instant invention will now be described with particular reference to the accompanying drawings.

BRIEF DESCRIPTION OF THE SEVERAL VIEWS OF THE DRAWINGS

The invention may be better understood by reference to the drawings in which.

DETAILED DESCRIPTION OF THE INVENTION

Figure 1:
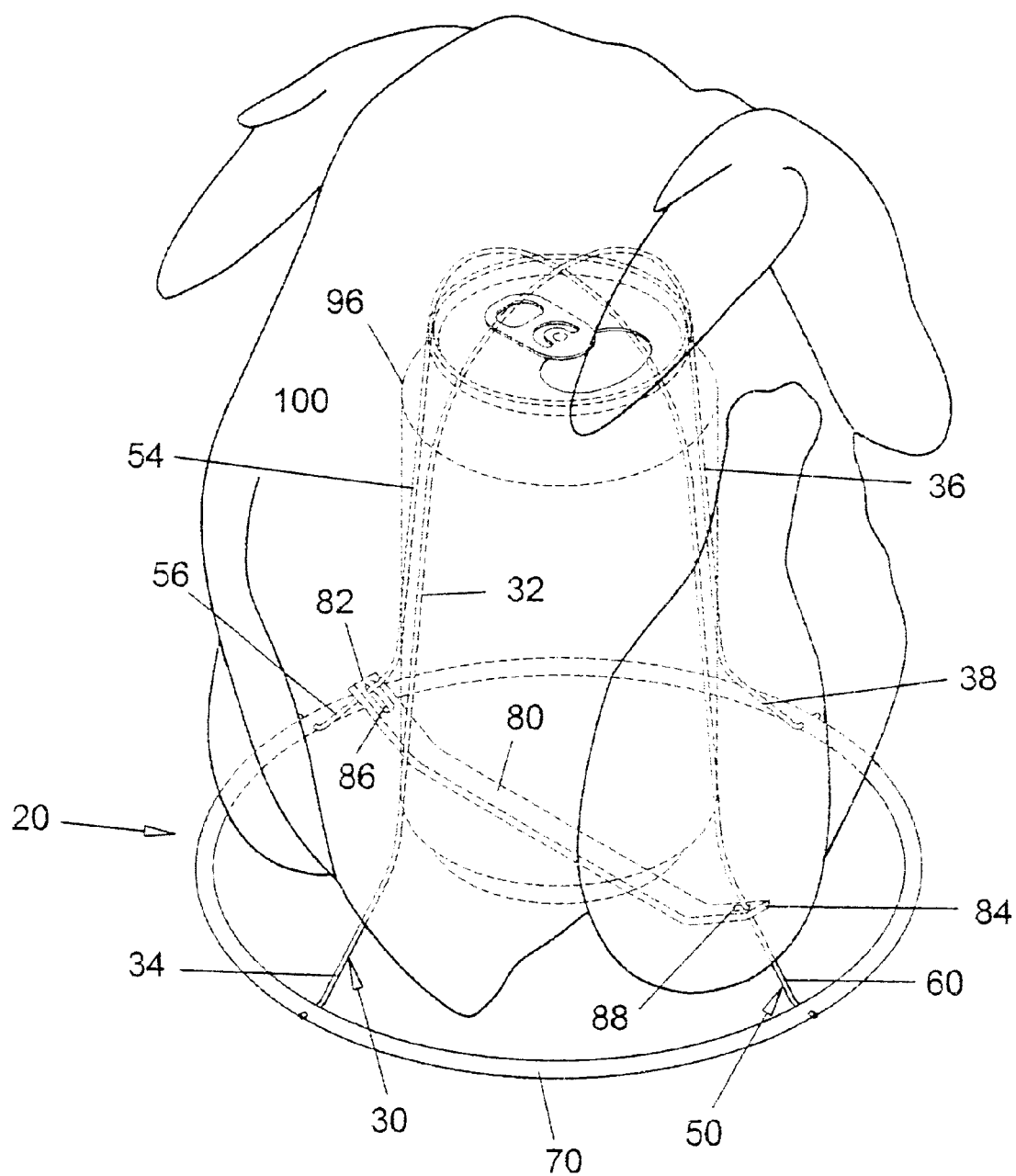
FIG. 1 is an isometric assembled view of the preferred embodiment for the present invention shown supporting a chicken and beverage can.

As seen in the FIGS., a cooking apparatus, including a is can retainer, for cooking chickens is provided and generally designated as reference numeral 20. Cooking apparatus 20 includes two post portions 30 and 50. Post portions 30 and 50 are each preferably "U" shaped and pivotally attached to a base member 70. However, the "U" shape of post portions 30 and 50 is not considered limiting. Base member 70 is preferably circular in shape, though such is not considered limiting. A first 30 of the two "U" shaped members is slightly longer in length that the second "U" shaped member 50, such that, when in use, larger first "U" shaped member 30 rides over second "U" shaped member 50. When "U" shaped members 30 and 50 begin to reach their "in use—assembled" position they begin to abut.

"U" shaped members 30 and 50 and base member 70 can be constructed from various substantially rigid materials, such as, but not limited to, steel, metal, aluminum, stainless steel, etc.

First "U" shaped member 30 includes a first leg portion 32 having an angled extension 34 and a second leg portion 36 having an angled extension 38. Preferably, portions 32 and 34, along with extensions 36 and 38, are constructed integral, though such is not limiting. Second "U" shaped member 50 includes a first leg portion 54 having an angled extension 56 and a second leg portion 58 having an angled extension 60. Preferably, portions 54 and 58, along with extensions 56 and 60, are constructed integral, though such is not limiting.

Angled extensions 34 and 38 of first "U" shaped member 30 are preferably welded to base member 70 such that they are pivotable or foldable with respect to base member 70. Similarly, angled extensions 56 and 60 are also preferably welded to base member such that they are pivotable or foldable with respect to base member 70. However, other attachment mechanism, pivotable/foldable and non-pivotable/non-foldable, for the angled extensions to base member 70 can also be used and are considered within the scope of the invention.

A small groove or notch 52 or other indentation is preferably provided at the top or apex of second "U" shaped member 50. Thus, when assembling cooking apparatus 20 for use, first "U" shaped member 30 rides over second "U" shaped member 50 until first member 30 drops into groove 52, where it is securely retained to maintain "U" shaped members 30 and 50 in their assembled vertical position during use (FIG. 1). The size of groove 52 is at least large enough to receive enough of a cross-sectional portion of first "U" shaped member 30 to securely retain first member 30 during use of the invention.

Figure 8:
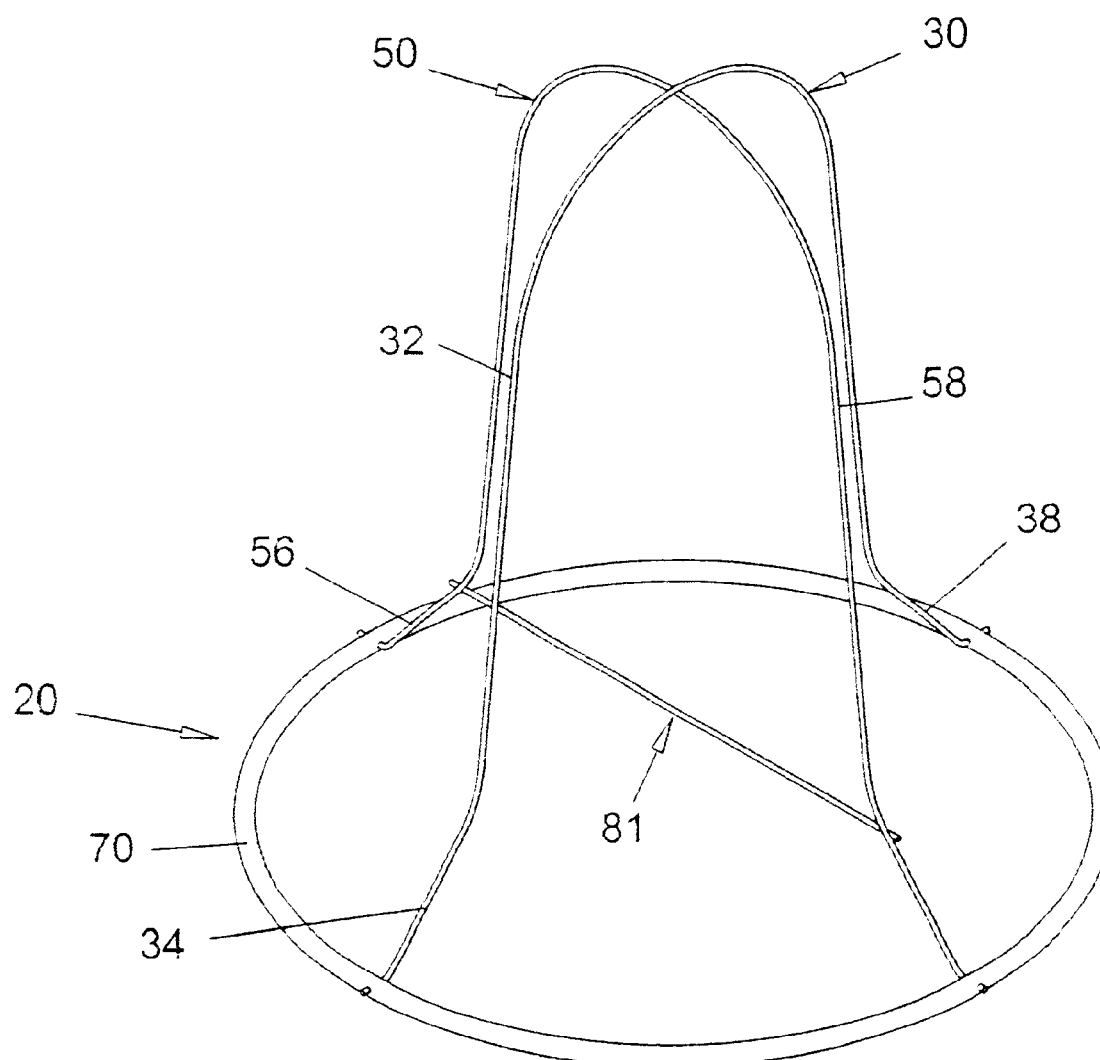
FIG. 8 is a isometric assembled view of the present invention illustrating the permanently attached vessel or beverage can holder.

A can or receptacle holder is preferably movably attached to second "U" shaped member 50. In one embodiment, can holder is shaped as an elongated support or swing bar 80 having a first end 82 (preferably angled) and a second end 84 (preferably angled). In another embodiment, can or receptacle holder can be permanently attached to second "U" shaped member 50 (FIG. 8). Though not limiting, the permanent holder can be a bar or rod 81 attached at two points to second "U" shaped member 50. A first aperture 86 can be provided at first end 82 for receipt therethrough of first leg portion 54 of second "U" shaped member 50. A second aperture 88 can be provided at second end 84 for receipt therethrough of second leg portion 56 of second "U" shaped member 50. Other shapes for the can holder can be provided and are considered within the scope of the invention. In its assembled position, the can holder is preferably located toward the bottom of cooking apparatus 20 to support a can 96 from the can's bottom. The angled or flared position of extensions 56 and 60 with respect to leg portions 54 and 58, respectively, of second "U" shaped member 50, define the bottom position for bar 80, as the distance between extensions 56 and 60 flare out which prevent bar 80 from any further travel.

Though a can 96, such as a twelve ounce beer can is preferred, the present invention is not limited to such, and other objects that hold liquid can be used in lieu of a beer can, such as a glass, cup, bottle, or other cans, etc. Cooking apparatus 20 can be used with various heating elements, such as but not limited to kettle grills, gas grills, ovens, etc., and is preferably used with a drip pan, pie plates, aluminum foil or similar device in use.

Figure 2:
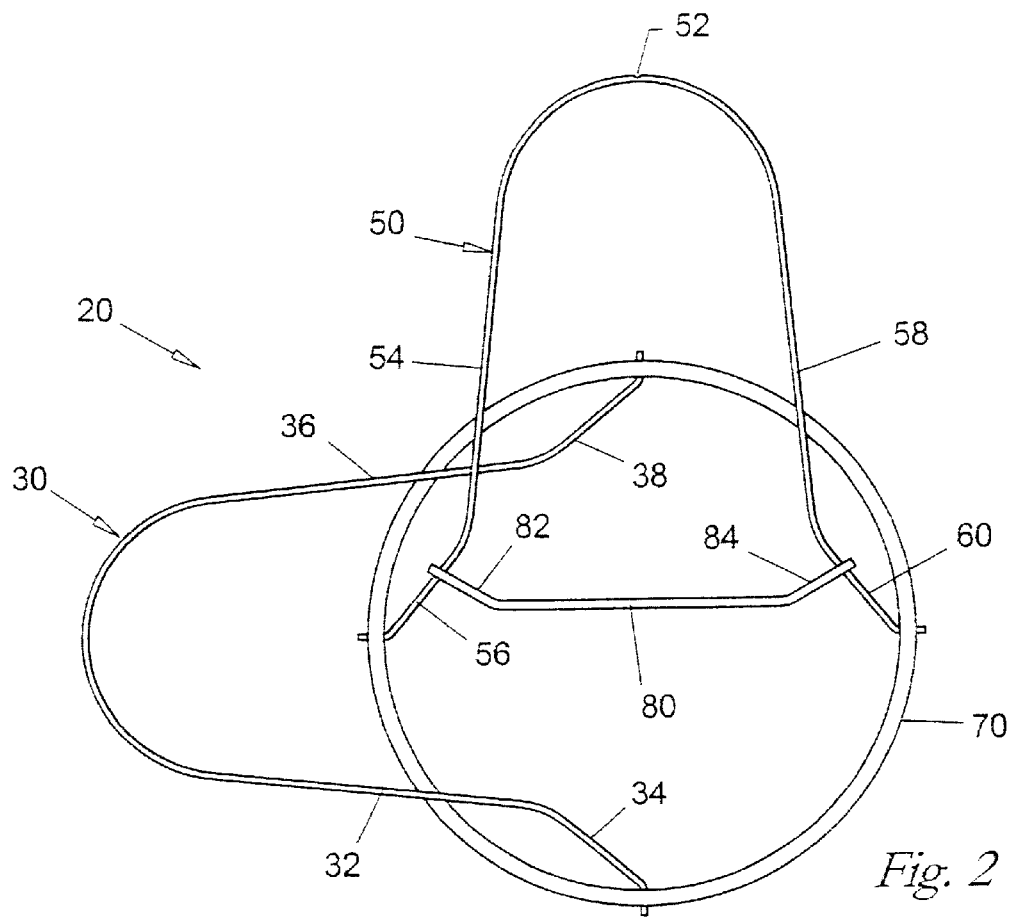
FIG. 2 is an isometric collapsed or folded view of the embodiment illustrated in FIG. 1.
Figure 3:
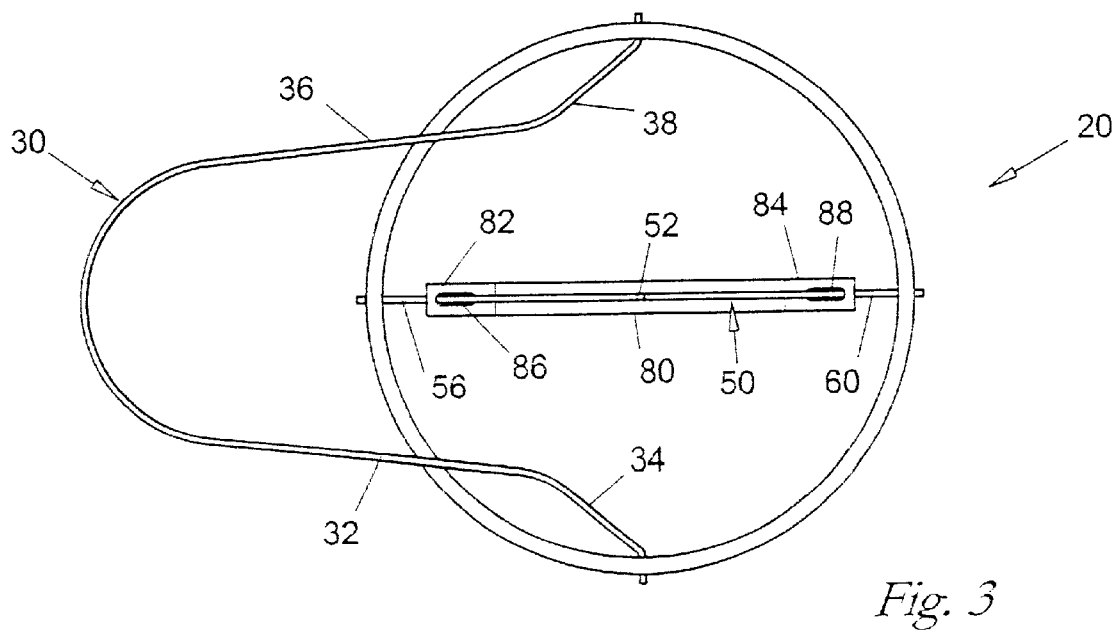
FIG. 3 is an isometric partially collapsed or folded view of the embodiment illustrated in FIG. 1.
Figure 7:
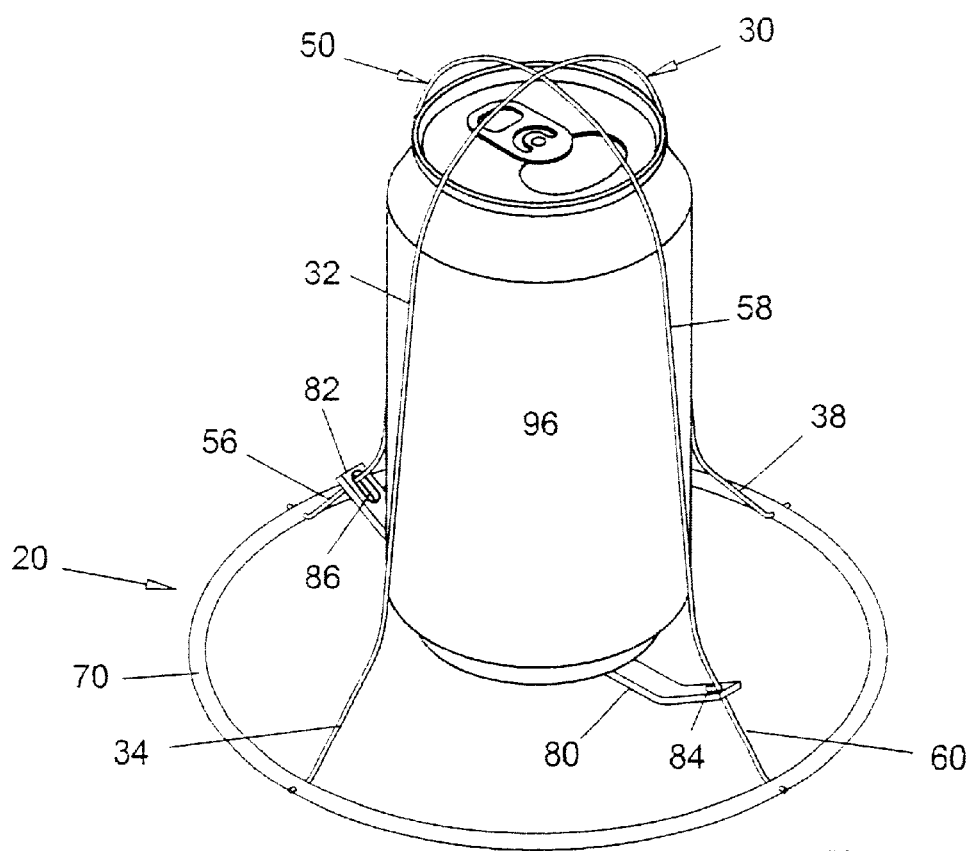
FIG. 7 is an isometric assembled view of the embodiment illustrated in FIG. 1 supporting a beverage can.
Figure 4:
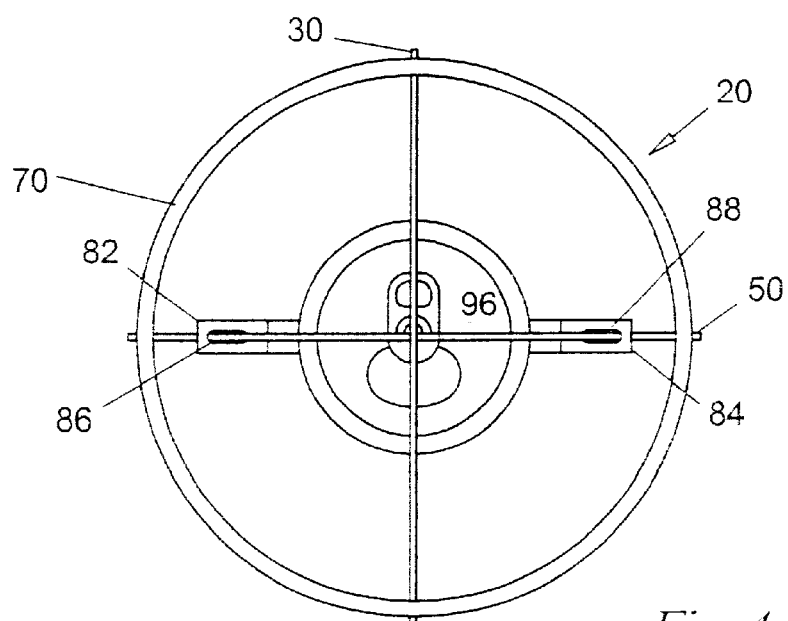
FIG. 4 is a top view of the assembled embodiment illustrated in FIG. 1 shown supporting a beverage can.
Figure 5:
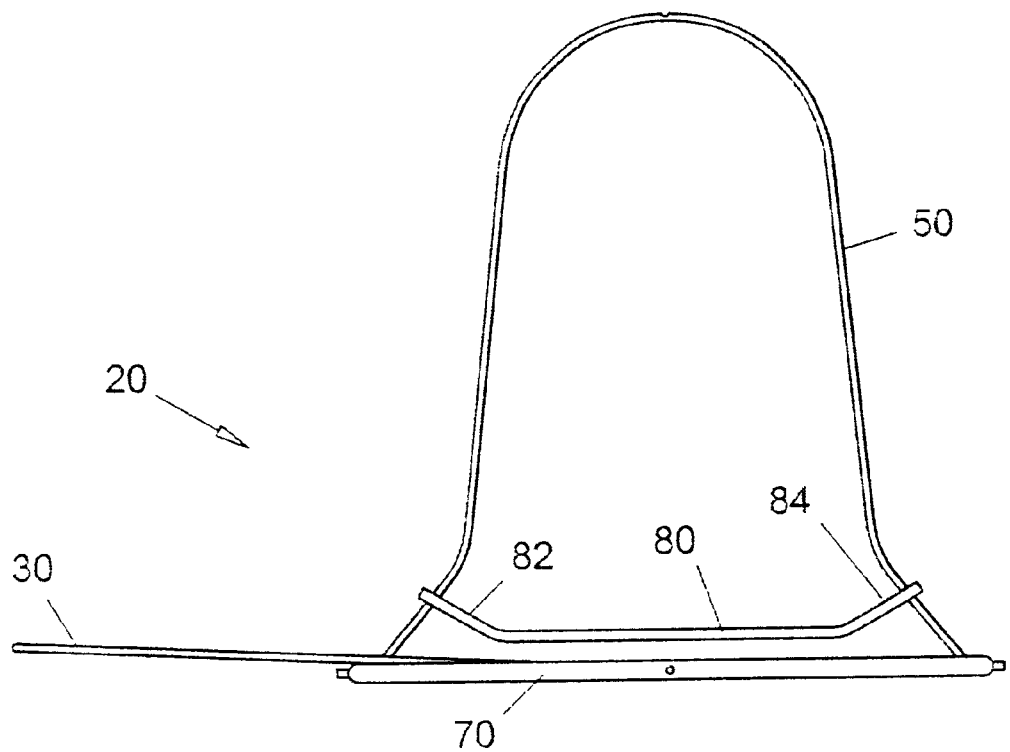
FIG. 5 is a front elevational partially collapsed of folded view of the embodiment illustrated in FIG. 1.
Figure 6:
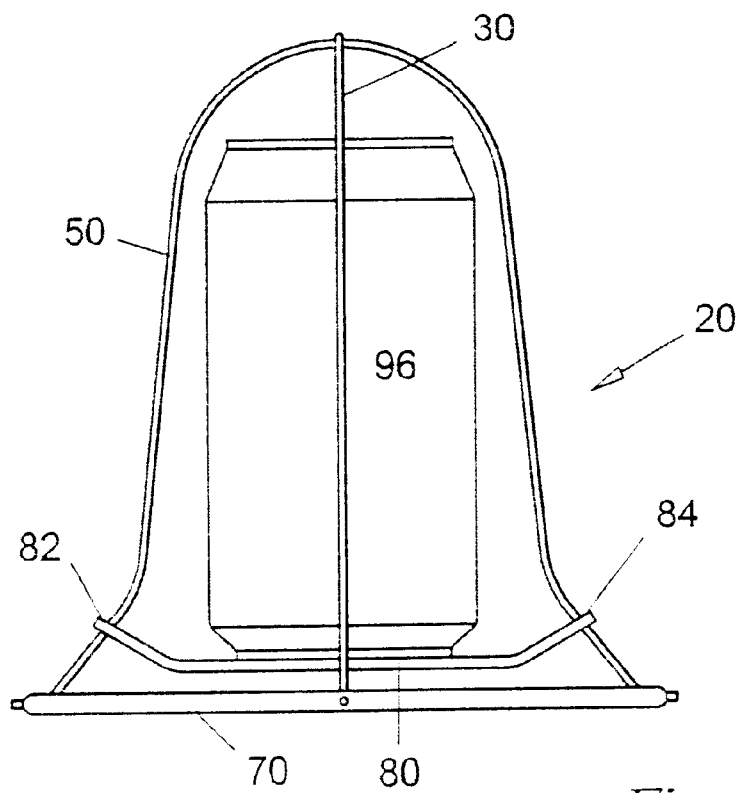
FIG. 6 is a front elevational view of the embodiment shown in FIG. 1 shown assembled in use supporting a beverage can and a chicken.

When not in use cooking apparatus 20 is collapsed or folded (See FIG. 2) for ease in storage or transit by popping first "U" shaped member 30 out of its resting position within groove 52 of second "U" shaped member 50. Such effort to remove first member 30 out of groove 52 of second member 50 can be achieved through a small amount of force from the user.

In use, the user opens beverage can 96, such as a beer or soda can, and empties out approximately half of its contents. However, the amount emptied, if any, is not considered limiting. Alternatively, an existing can or other receptacle can be used and filled with the liquid. Though not limiting, cooking apparatus 20 is preferably designed to accommodate a conventionally shaped twelve ounce beverage can. Additionally, spices and other ingredients can be added to the contents of beverage can 96.

Cooking apparatus 20 is assembled, by folding and locking "U" shaped members 30 and 50 in their vertical position, preferably while beverage can 96 is held in the center. Once members 30 and 50 are in proper locked position, movable bar 80 drops to its low/can supporting position (alternatively rod 81 is properly positioned by its permanent attachment points to second "U" shaped member 50). Beverage can 96 is disposed upon the upper surface of movable bar 80 or permanent bar/rod 81 and is supported thereby. Additionally, leg portions 32, 36, 52 and 58 can serve as stop members for preventing can 96 from tipping in the event cooking apparatus 20 is bumped. Assembled leg members 30 and 50 are then inserted within the cavity of chicken 100 (See FIG. 1).

Accordingly, cooking apparatus 20 supports a vessel of predetermined configuration for placement into the internal cavity of chicken 100 and also supports chicken 100 during cooking. Use of cooking apparatus 20, with vessel 96, helps to put the moisture back into chicken 100 normally lost during cooking.

When using cooking apparatus 20, with a charcoal grill, the coals are preferably banked to the sides, the upper grate is removed and chicken 100 is cooked on the lower grate. With gas grills, the swinging cooking grates are removed and chicken 100 is cooked directly over the flame.

In one embodiment, though not limiting, base member 70 can have a diameter of approximately six (6") inches. Base member 70, leg member 30 and/or leg member 50 can be constructed from stainless steel round bar, as well as other similar materials. In one embodiment, leg members 30 and 50 are constructed from ⅛" stainless steel round bar and base member 70 is constructed from 3/16" stainless steel round bar. Bar 80 in one embodiment is constructed from ⅛" stainless steel and approximately 5" inches in length. Bar/rod 81 can be constructed from stainless steel. However, it should be recognized that the invention is not limited to any specific dimensions or materials for leg member 30, leg member 50, base member 70, bar 80 and/or bar/rod 81.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A cooking apparatus supporting a chicken and positioning at least a portion of a vessel within an internal cavity of the chicken, said vessel holding a fluid; comprising:
   a base member;
   a first post portion attached to said base member;
   a second post portion attached to said base member; and
   means for supporting a vessel between said first post portion and said second post portion and above said base member;
   wherein said means for supporting is attached to a lower area of said second post portion such that in use the vessel is disposed upon said means for supporting above said base member and between said first portion and said second post portion.

2. The cooking apparatus of claim 1 wherein said first post portion is pivotally attached to said base member and said second post portion is pivotally attached to said base member.

3. The cooking apparatus of claim 1 wherein said means for supporting is an elongated bar attached to said second post portion.

4. The cooking apparatus of claim 1 wherein said first post portion is a first "U" shaped member and said second post portion is a second "U" shaped member.

5. The cooking apparatus of claim 1 wherein said second post portion having a groove adapted for receipt of a portion of said first post portion.

6. The cooking apparatus of claim 4 wherein said second "U" shaped member having a groove adapted for receipt of a portion of said first "U" shaped member.

7. A cooking apparatus supporting a chicken and positioning at least a portion of a vessel within an internal cavity of the chicken, said vessel holding a fluid, said cooking apparatus comprising:
   a base member;
   a first substantially "U" shaped member pivotally attached to said base member;
   a second substantially "U" shaped member pivotally attached to said base member; and
   means for supporting a vessel between said first substantially "U" shaped member and said second substantially "U" shaped member and above said base member.

8. The cooking apparatus of claim 7 wherein said base member is substantially circular in shape.

9. The cooking apparatus of claim 7 wherein said means for supporting is an elongated bar attached to said second "U" shaped member.

10. The cooking apparatus of claim 7 wherein said second "U" shaped member having a groove adapted for receipt of a portion of said first "U" shaped member.

11. A cooking apparatus supporting a chicken and positioning at least a portion of a vessel within an internal cavity of the chicken, said vessel holding a fluid, said cooking apparatus comprising:
   a base member;
   a first "U" shaped member pivotally attached to said base member;
   a second "U" shaped member pivotally attached to said base member; and
   means for supporting a vessel between said first "U" shaped member and said second "U" shaped member;
   wherein said second "U" shaped member having a groove adapted for receipt of a portion of said first "U" shaped member;
   wherein said means for supporting is an elongated bar movably attached to said second "U" shaped member.

12. The cooking apparatus of claim 11 wherein said first "U" shaped member having a first angled extension and a second angled extension and said second "U" shaped member having a third angled extension and a fourth angled extension, said first angled extension, said second angled extension, said third angled extension and said fourth angled extension pivotally attached to said base member.

13. The cooking apparatus of claim 12 wherein in use a portion of said first "U" shaped member is disposed within said groove of said second "U" shaped member to form a vertical post member and said elongated bar is attached at a first end to said second "U" shaped member adjacent said third angled extension and said elongated bar is attached at a second end to said second "U" shaped member adjacent said fourth angled extension.

14. The cooking apparatus of claim 13 wherein said post member adapted for insertion within the internal cavity of a chicken for support of the chicken during cooking.

15. The cooking apparatus of claim 13 wherein said elongated bar adapted for supporting the vessel containing the fluid.

16. A cooking apparatus supporting a chicken and positioning at least a portion of a beverage can within an internal cavity of the chicken, the at least a portion of said beverage can having an opening, the beverage can holding a fluid, said cooking apparatus comprising:
   a substantially circular base member;
   a first "U" shaped member pivotally attached to said base member;
   a second "U" shaped member pivotally attached to said base member, said second "U" shaped member having a groove adapted for receipt of a portion of said first "U" shaped member; and
   an elongated bar movably attached to said second "U" shaped, said elongated bar adapted for supporting a vessel between said first "U" shaped member and said second "U" shaped member.

17. The cooking apparatus of claim 16 wherein said first "U" shaped member having a first angled extension and a second angled extension and said second "U" shaped member having a third angled extension and a fourth angled extension, said first angled extension, said second angled extension, said third angled extension and said fourth angled extension pivotally attached to said base member.

18. The cooking apparatus of claim 17 wherein in use a portion of said first "U" shaped member is disposed within said groove of said second "U" shaped member to form a vertical post member and said elongated bar is attached at a first end to said second "U" shaped member adjacent said third angled extension and said elongated bar is attached at a second end to said second "U" shaped member adjacent said fourth angled extension.

19. The cooking apparatus of claim 18 wherein said post member adapted for insertion within the internal cavity of a chicken for support of the chicken during cooking.

20. The cooking apparatus of claim 18 wherein said elongated bar adapted for supporting the vessel containing the fluid.

21. A cooking apparatus supporting a chicken and positioning at least a portion of a vessel within an internal cavity of the chicken, said vessel holding a fluid, said cooking apparatus comprising:
   a base member;
   a first post member attached to said base member;
   a second post member attached to said base member; and
   a vessel support member movably attached to said second post member.

22. The cooking apparatus of claim 21 wherein said support member adapted for supporting a vessel between said first post member and said second post member.

23. The cooking apparatus of claim 21 wherein said first post member is a first substantially "U" shaped member and said second post member is a second substantially "U" shaped member.

24. The cooking apparatus of claim 21 wherein said first post member is pivotally attached to said base member and said second post member is pivotally attached to said base member.

25. The cooking apparatus of claim 1 wherein said first post portion and said second post portion both remain attach to said base member in both a collapsed position and an assembled position.

26. The cooking apparatus of claim 7 wherein said first substantially "U" shaped member and said second substantially "U" shaped member both remain attach to said base member in both a collapsed position and an assembled position.

27. The cooking apparatus of claim 21 wherein said first post member and said second post member both remain attach to said base member in both a collapsed position and an assembled position.

28. The cooking apparatus of claim 1 wherein said means for supporting is independent of said base member.

29. The cooking apparatus of claim 7 wherein said means for supporting is independent of said base member.

* * * * *